United States Patent
Großmann et al.

(10) Patent No.: US 12,410,918 B2
(45) Date of Patent: Sep. 9, 2025

(54) OPERATOR CONTROL DEVICE COMPRISING A MULTI-PART OPERATOR CONTROL ELEMENT, AND DOMESTIC APPLIANCE AND METHOD FOR OPERATING A DOMESTIC APPLIANCE

(71) Applicant: BSH Hausgeräte GmbH, Munich (DE)

(72) Inventors: Jenny Großmann, Hamburg (DE); Nico Zendel, Weyarn (DE)

(73) Assignee: BSH Hausgeräte GmbH, Munich (DE)

( * ) Notice: Subject to any disclaimer, the term of this patent is extended or adjusted under 35 U.S.C. 154(b) by 650 days.

(21) Appl. No.: 17/788,765

(22) PCT Filed: Jan. 21, 2021

(86) PCT No.: PCT/EP2021/051280
§ 371 (c)(1),
(2) Date: Jun. 24, 2022

(87) PCT Pub. No.: WO2021/160396
PCT Pub. Date: Aug. 19, 2021

(65) Prior Publication Data
US 2023/0030328 A1    Feb. 2, 2023

(30) Foreign Application Priority Data
Feb. 10, 2020 (DE) .......................... 102020201626.7

(51) Int. Cl.
*F24C 3/12* (2006.01)
*F24C 7/08* (2006.01)
(Continued)

(52) U.S. Cl.
CPC .............. *F24C 7/086* (2013.01); *F24C 3/126* (2013.01); *G05G 1/015* (2013.01); *G05G 1/08* (2013.01);
(Continued)

(58) Field of Classification Search
CPC ......... F24C 7/086; F24C 3/126; G05G 1/015; G05G 1/08; G05G 1/10; G05G 1/082; G06F 3/0362; G06F 3/0488
(Continued)

(56) References Cited

U.S. PATENT DOCUMENTS 2,909,108 A * 10/1959 Rander .................... G03B 3/00
                                                              396/529
2012/0012721 A1    1/2012 Baier
2017/0102499 A1*  4/2017 Arceo ................... G06F 3/0354

FOREIGN PATENT DOCUMENTS

CN    101471198 A    7/2009
CN    205938088 U    2/2017
(Continued)

OTHER PUBLICATIONS

International Search Report PCT/EP2021/051280 dated Apr. 9, 2021.
National Search Report CN 202180013584.4 dated Jul. 5, 2024.

*Primary Examiner* — Vivek K Shirsat
(74) *Attorney, Agent, or Firm* — Michael E. Tschupp; Andre Pallapies; Brandon G. Braun

(57) ABSTRACT

An operator control device for a household appliance includes an operator control element defining a longitudinal axis. The operator control element includes a cylindrical main part and an adjusting ring separate from the main part and arranged so as to engage around the main part. The adjusting ring is displaceable relative to the main part in a direction of the longitudinal axis of the operator control element for adjusting an operating condition of the household appliance. A display unit displays information on a display region on a lateral wall of the main part of the operator control element.

18 Claims, 2 Drawing Sheets

(51) Int. Cl.
  *G05G 1/015* (2008.04)
  *G05G 1/08* (2006.01)
  *G06F 3/0362* (2013.01)
  *G06F 3/0488* (2022.01)
(52) U.S. Cl.
  CPC .......... *G06F 3/0362* (2013.01); *G06F 3/0488* (2013.01)
(58) Field of Classification Search
  USPC ............................................ 126/1 R; 116/21
  See application file for complete search history.

(56) References Cited

FOREIGN PATENT DOCUMENTS

| | | | | |
|---|---|---|---|---|
| CN | 207458820 U | 6/2018 | | |
| DE | 102006059725 A1 | 6/2008 | | |
| DE | 102011007471 A1 * | 10/2012 | .............. | F24C 7/085 |
| DE | 102017218173 A1 | 4/2019 | | |
| EP | 2234000 A2 | 9/2010 | | |
| GB | 2470111 A | 11/2010 | | |
| WO | 2010007076 A1 | 1/2010 | | |

* cited by examiner

OPERATOR CONTROL DEVICE COMPRISING A MULTI-PART OPERATOR CONTROL ELEMENT, AND DOMESTIC APPLIANCE AND METHOD FOR OPERATING A DOMESTIC APPLIANCE

CROSS-REFERENCES TO RELATED APPLICATIONS

This application is the U.S. National Stage of International Application No. PCT/EP2021/051280, filed Jan. 21, 2021, which designated the United States and has been published as International Publication No. WO 2021/160396 A1 and which claims the priority of German Patent Application, Serial No. 10 2020 201 626.7, filed Feb. 10, 2020, pursuant to 35 U.S.C. 119 (a)-(d).

The contents of International Application No. PCT/EP2021/051280 and German Patent Application, Serial No. 10 2020 201 626.7 are incorporated herein by reference in their entireties as if fully set forth herein.

BACKGROUND OF THE INVENTION

One aspect of the invention relates to an operator control device for a household appliance. The operator control device has an operator control element. The operator control element has a cylindrical main part. The operator control device also has a display unit with which information can be displayed on a display region of a lateral wall of the main part. A further aspect of the invention relates to a household appliance with such an operator control device. A yet further aspect relates to a method for operating a household appliance.

Operator control devices for household appliances are known in a wide variety of embodiments. It is therefore known that an operator control device has a rotary knob, for example. Such a rotary knob is usually embodied with a cylindrical main part. This cylindrical main part can be rotated about an axis of rotation. This enables operating conditions to be adjusted. It is also known in this context that such a rotary knob can be moved with its main part in the axial direction. As a result, this rotary knob as such can be recessed in the operator control device when it is not needed. In a position of use, this rotary knob is extended out of this recessed position in the axial direction. No operator control of the household appliance can be adjusted by way of the axial movement, however.

It is also known that, with such operator control elements of a household appliance, information can be displayed on a lateral wall of this cylinder shape. In DE 10 2017 218 173 A1, for example, this takes place with an external image projector, which projects information optically onto this lateral wall from the outside.

Furthermore, an illuminated operator control element for a household appliance is known from DE 10 2008 033 793 A1. There, the lateral surface of the cylindrical rotary knob has at least one luminous surface. It is also possible for a display to be able to take place on the end face of this cylinder. Corresponding subject matter is also known from DE 10 2016 210 171 A1. In the known embodiments, this operator control element is embodied only with a cylindrical main part of this kind. The display of information thereon is therefore on the one hand only possible via external, highly complex and costly additional components. On the other hand, the space requirement is restricted on account of the associated fixed size of the cylindrical main part, or on the other hand this lateral surface is dimensioned sufficiently large that information can also be displayed. Main parts of this kind then become relatively large. On the other hand, it can be the case that a user obscures this displayed information at least partially when gripping the lateral surface in order to rotate this main part, and thus the displayed information is perceptible only to a limited extent.

BRIEF SUMMARY OF THE INVENTION

The object of the present invention is to create an operator control device, a household appliance and a method in which the operator control element of an operator control device is simple to operate and information displayed on the operator control element can nevertheless be perceived in an improved manner.

This object is achieved by an operator control device, a household appliance and a method as claimed in the independent claims.

One aspect of the invention relates to an operator control device for a household appliance. The operator control device has at least one operator control element. This operator control element has a cylindrical main part. The operator control device also has an electronic display unit with which information can be displayed optically on a display region on the lateral wall of the main part. The operator control element has an adjusting ring which is separate from the main part. This adjusting ring is arranged on the main part. The adjusting ring engages around the main part in the circumferential direction about a longitudinal axis of the operator control element. The adjusting ring can be displaced relative to the main part in the direction of a longitudinal axis of the operator control element for adjusting operating conditions of the household appliance. A multi-part operator control element is provided by such an embodiment of an operator control device. This multi-part nature manifests itself in two very specific individual parts. These are the cylindrical main part and the adjusting ring which is separate therefrom. Furthermore, these two separate components are also arranged individually in relation to one another. The adjusting ring namely engages around the outside of the main part. In particular, the adjusting ring thus also represents an enclosing ring which surrounds the main part circumferentially on the lateral wall. The defined movability of the adjusting ring relative to the main part enables the operability of the operator control element to be designed in a highly user-friendly manner. In addition, a compact design of the operator control element is enabled. Furthermore, it is also made possible specifically by this embodiment for information to be displayed optically also directly on the lateral wall of the main part. On account of the movability of the adjusting ring in the axial direction, it is then also possible to perceive the information displayed on the display region in an improved manner. On account of the adjusting ring, it is nevertheless very easy to grip this adjusting ring without the need for the main part to be gripped directly in this regard by a user. In addition, the mere linear displacement of the adjusting ring along the longitudinal axis enables a simple and ergonomic operator control concept for adjusting at least one operating condition of the household appliance. In this context, specifically for this actuation scenario, it is therefore no longer necessary for the main part also to be moved. During this actuation of the adjusting ring, said main part can remain arranged without a change of position. An operating condition of a household appliance can be an adjustment of a function of the household appliance. An adjustment can be a selection and/or start. A function can be a function for preparing food. The functional units of the household appliance required for this purpose are then adjusted accordingly.

It is preferably provided that the display region is obscured by the adjusting ring in an axial basic position of the adjusting ring. This is a further very advantageous embodiment. On the one hand, the axial extent of the entire operator control element is thereby minimized in this basic position. This is because there is a maximum axial overlap between the adjusting ring and the main part in this basic position. A very particular advantage is then achieved in this basic position, since the display region is protected by the adjusting ring. Damage or other impairment, such as for example contamination, of the display region can thus be avoided in a particularly advantageous manner. The adjusting ring thus has a multi-functional nature. On the one hand, it is movable such that defined operating conditions can be adjusted, while on the other hand it also serves as a protective element in its basic position. This applies on the one hand to the display region. On the other hand, the main part is thus also protected at least on the lateral wall, since the adjusting ring surrounds this main part circumferentially.

It is possible for the adjusting ring and the main part to be embodied from different materials. The adjusting ring can be embodied for example from plastic. It can however also be embodied for example from wood or metal. On account of this separation of the two components of the operator control element, it is thus also possible to create different optical appearances of the operator control element. It is also possible in this context for a main part to be used as an identical component for different variants of the operator control element. In one advantageous embodiment, the difference then results from individual adjusting rings. In this context, an individual color scheme and/or material embodiment and/or structuring of the adjusting ring can be provided. In this regard, the adjusting ring can also be embodied to be mechanically more robust and thus more sturdy than the main part.

In one advantageous embodiment, it is provided that the display region is exposed in an axial displacement position of the adjusting ring on the main part. This means that in this at least one axial displacement position, which is different from an axial basic position of the adjusting ring, the display region is then visible. On the one hand, this displacement position is thus also associated with an operating condition adjustment of the household appliance in one advantageous embodiment, while on the other hand at the same time the display region is no longer obscured in comparison with the basic position of the adjusting ring. The exposure of the display region is thus carried out automatically with this axial displacement of the adjusting ring for setting an operating condition.

Viewed in the depth direction of the operator control device, this axial displacement position is in particular such that the adjusting ring is positioned further forward than in its basic position.

It can be provided that the adjusting ring is arranged in its axial basic position with a front edge flush with a front face of the cylindrical main part. This results in a contiguous front surface of the operator control element as a whole. It can however also be provided that, in the basic position of the adjusting ring, the front edge of the adjusting ring is positioned further forward than the front face of the main part. It is likewise possible for the front edge of the adjusting ring to be positioned further back than the front face of the cylindrical main part in this basic position of the adjusting ring. Being positioned further forward or back refers to a front view of the operator control element, so that being positioned further forward means that this element is then arranged closer than the other element to the observer positioned at the front.

In particular, no operating condition adjustment of the household appliance is associated with the basic position of the adjusting ring. In this axial position, therefore, no provision is made for a link to an operating condition adjustment. It can however be provided that this adjusting ring can be rotated about the longitudinal axis relative to the main part in this axial basic position. It is thus possible to adjust an operating condition by means of such a rotational movement in this axial basic position.

In one advantageous embodiment, it is provided that an axial displacement position is a position of the adjusting ring relative to the main part which is shifted forward in comparison with the axial basic position. It can also be provided that at least two defined axial displacement positions of the adjusting ring are adjustable. These axially defined displacement positions are thus entirely discrete axial positions of the adjusting ring relative to the main part when viewed along the longitudinal axis.

It can be provided that these axial displacement positions can be perceived haptically. For example, provision can be made in this context for the adjusting ring to snap into the axial displacement position.

It can also be provided that the adjusting ring has a height, measured in the direction of the longitudinal axis, which corresponds to the height of the lateral wall of the main part. As a result, a design with maximum axial compactness can be achieved in the basic position of the operator control element, in which the adjusting ring is also arranged in its axial basic position. In addition, it can then also be made possible by this embodiment for the entire lateral wall of the main part to be obscured completely by the adjusting ring in this axial basic position of the adjusting ring. This height of the adjusting ring is preferably smaller than the height of the lateral wall. In particular, in an axial basic position of the adjusting ring, a rear edge of the adjusting ring is spaced apart from a front face of an operator control panel of the operator control device. The operator control element is preferably arranged on this operator control panel.

In one advantageous embodiment, it is provided that, in at least one defined axial displacement position of the adjusting ring which is different from an axial basic position of the adjusting ring, a function of the household appliance linked thereto is adjusted automatically. This means that a selection or start of this operating condition adjustment linked thereto is associated with the reaching of this defined axial displacement position. In this context, the function can be a specific operating function. This can be a selection of a functional unit of the household appliance, for example. This can be provided with a cooking appliance, for example. A functional unit can be a fan or a heating unit of the household appliance, for example. In the case of a hob, which is a different exemplary embodiment in comparison to an oven for a cooking appliance, the functional unit can be a heating unit of a cooking zone, for example.

This exemplary representation for cooking appliances is to be understood to be non-restrictive. Accordingly, the operator control device can also be provided for other household appliances, for example for laundry care, such as a washing machine or a tumble dryer or a washer-dryer. An operator control device of this kind can also be provided for another household appliance, such as for example an extractor hood or a deep-fat fryer or a fully automatic coffee machine or the like. A household appliance for storing and preserving food can likewise be provided, and can be for example a refrigerator or a freezer or a combined fridge-freezer. A household appliance can likewise be a dishwasher, for example.

In one advantageous embodiment, it is provided that in at least one axial displacement position of the adjusting ring, which is different from an axial basic position of the adjusting ring, the adjusting ring has an axially fixed position. As a result, the adjusting ring does not have to be held in place in this defined axial displacement position by the user himself. A positioning unit can be provided for this axial position fixing, for example. This positioning unit can also be a locking unit. A unit of this kind can be a push-pull mechanism, for example.

This enables the adjusting ring to retain its axial position even in the axial displacement position such that it can then also be released by a user, for example.

In one advantageous embodiment, it is provided that in an axial displacement position which is different from an axial basic position and in which the adjusting ring is displaced axially relative to the main part, the adjusting ring can be rotated about the longitudinal axis for adjusting at least one operating condition of the household appliance. In one advantageous embodiment, the longitudinal axis in this context also forms the axis of rotation. For this purpose, it can be provided for example that a defined function of the household appliance can be selected with the axial displacement position. With the subsequently ensuing rotation of the adjusting ring about the longitudinal axis relative to the main part, it is then possible to adjust an operating parameter in terms of value, for example. This operating parameter can be an operating parameter of the previously selected function.

In one advantageous embodiment, it is provided that the display region is a touch-sensitive display region. An actuation can take place by means of direct touching. The display region can be a touch display, for example.

In one advantageous embodiment, it is provided that several function symbols for functions of the household appliance are displayed on the display region. In one advantageous embodiment, these can be arranged on the display region in particular in the circumferential direction about the longitudinal axis. They are thus arranged in series relative to one another in this azimuthal direction. This enables as compact a design as possible of the display region in the axial direction. The visibility and perceptibility for a user is also improved on account of this azimuthal arrangement.

In one advantageous embodiment, it is provided that the function symbols can be changed in terms of their azimuthal sequential position. In one advantageous embodiment, such a change of sequence of these function symbols can also take place automatically. This can take place as a function of the actuation of the adjusting ring, for example. For example, in an adjustment of a first axial displacement position of the adjusting ring, a sequence of the arrangement of the function symbols in this regard can be different from the basic position. In addition or instead, in an advantageous embodiment in which a second axial displacement position can be adjusted in a defined manner, this sequence of the arrangement of the function symbols can likewise once again be different.

It is also possible for this change of the azimuthal sequential position of the function symbols to be carried out by a user himself. This can take place for example in that, if the display region is touch-sensitive, the user then touches the function symbols and displaces them into the desired azimuthal location on the display region.

In one advantageous embodiment, it can therefore be provided that a function symbol can be displaced by swiping it along the display region with a finger, for example into the 12 o'clock position. This then enables the function symbol to be identified and viewed in a particularly advantageous and simple manner by an observer.

It is preferably provided that the function whose function symbol is arranged in the 12 o'clock position on the display region can be selected with the adjusting ring and/or an operating parameter of this function can be adjusted by actuating the adjusting ring.

In one advantageous embodiment, it is provided that the display unit is arranged in the main part. The main part is preferably embodied to be hollow. As a result, this cavity can be used particularly advantageously to receive further components in this regard. A particularly compact design of the operator control device is thus enabled.

A further aspect of the invention relates to a household appliance with an operator control device as claimed in the aforementioned aspect or an advantageous embodiment thereof. The household appliance can, as already explained above, be embodied for food preparation or for laundry care or for dishwashing or for food storage and preservation. It can also be a small household appliance in this regard, as already explained above.

It is therefore advantageously provided that this household appliance has a display, which is located on the lateral wall of the main part of the operator control element. It can also be provided that, in addition thereto, a display region is embodied on a front face or a front wall of the operator control element, in particular of the main part. In addition or instead, a front edge of the adjusting ring can also be embodied as a display region. In particular, here too, this display is generated electronically. As a result, electronically generated optical information can be displayed. It can be provided that the display regions are dynamic and thus the information to be displayed thereon can change. In particular, this lateral surface of the main part is used for the main interaction with the household appliance. A possible display region on the front of the operator control element can serve mainly to generate a remote effect. This means that a user can perceive a display in this regard even at a certain distance from the household appliance. In order to switch on the household appliance or a functional unit of the household appliance, in one advantageous embodiment the adjusting ring of the operator control element is brought into an axial displacement position.

The core of the operator control element, which is formed by the main part, remains fixed. The fixed arrangement of the main part is preferably in all positions of the adjusting ring. The main part cannot therefore be rotated about the longitudinal axis. In one advantageous embodiment, it thus serves merely as a carrier for the adjusting ring and as a carrier for the display region.

It can be provided that the entire operator control element can be arranged in a position of use and in a position of non-use. For example, in the position of non-use the entire operator control element can be recessed in the axial direction. In particular in an operator control panel of the operator control device. This operator control element is arranged on the operator control panel. To use the operator control element, the operator control element can be moved forward in its entirety out of this recessed position in the operator control panel so that it protrudes forward. Only in this position of use can it then be actuated in order to be able to adjust operating conditions of the household appliance. It can be provided for example that a first axial displacement position is provided for a certain function of the household appliance and a link is provided in this regard. It can also be provided that an at least second further axial displacement position of the adjusting ring is provided. A function can then be selected directly in this position, for example. It can be provided that, in the case of cooking appliances, the power setting is directly accessible and is adjusted directly when the adjusting ring is rotated. In another possible household appliance, which can be for example a ventilation appliance, the main function is adjustable in this regard.

In order to additionally select or adjust further functions of the household appliance, the user can tap on the respective function to the right or left of this main function, which can be displayed on the display region with a function symbol, if this display region is touch-sensitive. In this regard, a change of the sequential position, as already described above, can be completed individually by the user. The user can then displace this function symbol to the desired location. The adjusting ring can then be used to select or adjust the function. Said function can be a time function in this context. Here, it is possible for example to adjust the duration of a selected preparation program. It can be provided that this adjustment of the function symbol in terms of its sequence is only temporary. This means that, after a predetermined duration, the function symbol that was displaced returns to the position it had in a basic position of the function symbols. In this regard, a factory setting can thus be predetermined on the appliance side for the sequential position of the function symbols. It can however also be provided that this user-side change of the sequential position of the function symbols remains effective until a user once again makes an individual change in this regard.

Function symbols and/or letters and/or numbers can be displayed on the display region. They can be displayed individually in this regard in terms of size and/or color. The display can be static in this regard. A dynamic display can however also be present. This enables for example the color and/or the size of the information to be displayed to be changed individually.

Once the use of the operator control element has finished, the adjusting ring can be returned to the basic position. This can take place for example by the user himself. As a result, he can proceed by gripping the adjusting ring directly and displacing it in the axial direction from the displacement position back to the basic position. This can take place for example by means of a push-pull mechanism. A release of the snap-fit connection can also be provided in this regard.

It is also possible for the adjusting ring to be moved into the basic position automatically. This can take place for example by a front face or a front wall of the main part being a touch-sensitive region. When a user presses this touch-sensitive region of the main part, the adjusting ring can thus be displaced automatically from an axial displacement position into the axial basic position. As a result, the adjusting ring does not then have to be gripped directly and pushed into the basic position by the user. Instead, this then takes place by means of a motor. The motor can be arranged for example in the operator control element.

A further aspect of the invention relates to a method for operating a household appliance. In particular, an operator control device as claimed in the above-cited aspect or an advantageous embodiment thereof is used in the method. An operator control element of the operator control device is actuated and, as a function of the actuation, an operating condition of the household appliance is adjusted. Upon actuation, the adjusting ring of the operator control element is drawn forward axially relative to the main part of the operator control element and an operating condition of the household appliance is thereby adjusted.

Advantageous embodiments of the operator control devices are to be regarded as advantageous embodiments of the method. Here, components forming part of the operator control device are provided and are suitable for carrying out the corresponding method steps for adjustment either on their own or in interaction with other components forming part of the operator control device.

The designations "above", "below", "in front", "behind", "horizontal", "vertical", "depth direction", "width direction", "height direction", etc. indicate positions and orientations during proper use and positioning of the arrangement.

Further features of the invention are disclosed in the claims, the figures and the description of the figures. The features and combinations of features mentioned in the description above and the following features and combinations of features in the description of the figures and/or shown in the figures alone are usable not only in the respective combination given, but also in other combinations without departing from the scope of the invention. Embodiments of the invention which are not explicitly shown in the figures and described, but which arise and can be created through separate combinations of features from the embodiments described, are therefore also to be considered as included and disclosed. Embodiments and combinations of features can also be regarded as disclosed which therefore do not have all the features of an originally formulated independent claim. Furthermore, embodiments and combinations of features are to be regarded as disclosed, in particular by the embodiments disclosed above which go beyond or deviate from the combinations of features represented by the references in the claims.

BRIEF DESCRIPTION OF THE DRAWINGS

Exemplary embodiments of the invention will now be described in greater detail making reference to schematic drawings, in which.

DETAILED DESCRIPTION OF EXEMPLARY EMBODIMENTS OF THE PRESENT INVENTION

Figure 1:
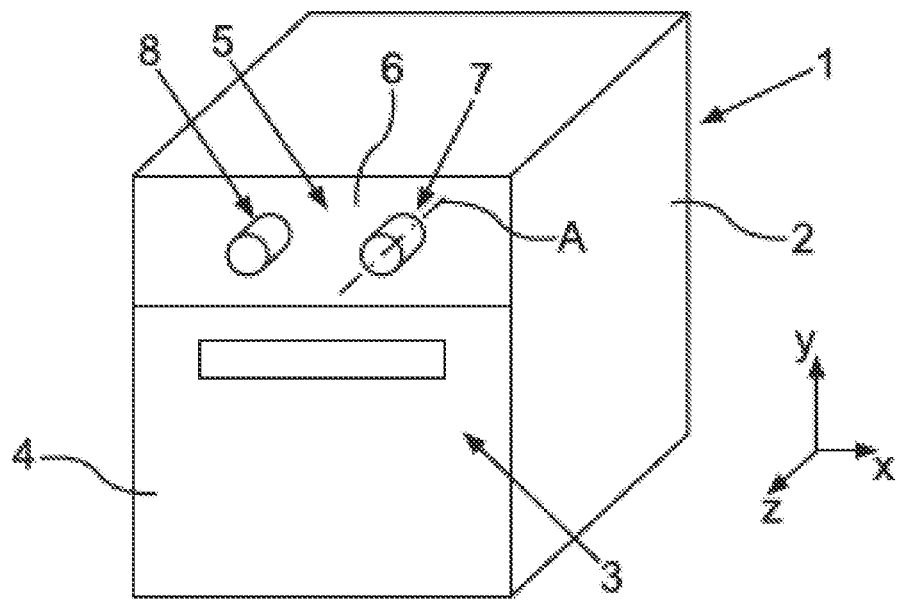
FIG. 1 shows a simplified representation of an exemplary embodiment of a household appliance according to the invention with an exemplary embodiment of an operator control device according to the invention.

In the figures, identical or functionally identical elements are provided with the same reference characters.

FIG. 1 shows a schematic representation of a household appliance 1. Here, the household appliance 1 is a cooking appliance. It is in particular an oven. The household appliance 1 has a housing 2 in the exemplary embodiment shown. A cooking chamber 3 is embodied in the housing 2. Said cooking chamber can be closed by means of a door 4. The household appliance 1 also has an operator control device 5. In one advantageous embodiment, the operator control device 5 has an operator control panel 6. The operator control device 5 also has at least one operator control element 7. At least two operator control elements 7 and 8 are embodied in the exemplary embodiment. The operator control elements 7 and 8 can be embodied identically. They can however also be embodied differently. More than two operator control elements can also be provided.

Figure 2:
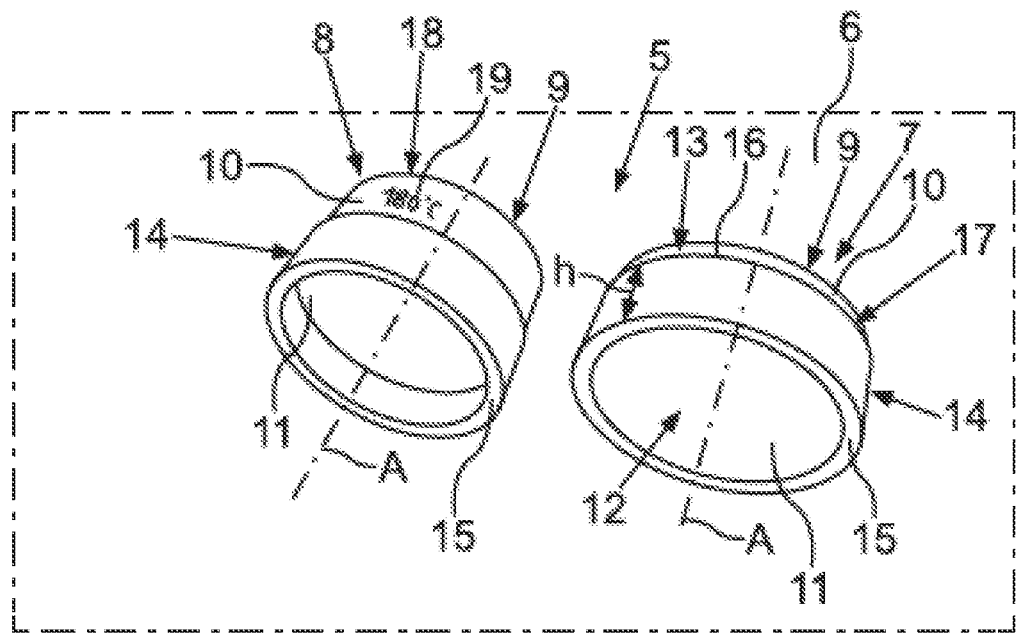
FIG. 2 shows a representation of the operator control element of the operator control device with an adjusting ring in an axial basic position and a further operator control element with an adjusting ring in an axial displacement position.

FIG. 2 shows an enlarged representation of subcomponents of the operator control device 5. The operator control element 7 has a cylindrical main part 9. The cylindrical main part 9 is arranged in particular with a fixed position. In particular, it is arranged with a fixed position on the operator control panel 6. The cylindrical main part 9 has a lateral wall 10. It also has a front face 11. An electronic display region 12 can be embodied on the front face 11. The display region 12 can be embodied to be touch-sensitive. It can also be provided that no display region 12 is provided on the front face 11, said front face 11 nevertheless being embodied at least in regions to be touch-sensitive.

This operator control element 7 has a longitudinal axis A. The longitudinal axis A is oriented in the depth direction (z direction) in the exemplary embodiment. The longitudinal axis A is also the cylinder axis of the main part 9. In particular, the cylindrical main part 9 is embodied to be hollow. As a result, further components of the operator control device 5, in particular of the operator control element 7, can be received therein. These can be components of a display unit 13, for example. The display unit 13 is part of the operator control device 5. In one advantageous embodiment, this display unit 13 is part of the operator control element 7. Furthermore, the operator control element 7 has an adjusting ring 14. The adjusting ring 14 is a component which is separate from the main part 9. The adjusting ring 14 is fully closed in the circumferential direction. The adjusting ring 14 surrounds the main part 9 circumferentially. This means that the adjusting ring 14 surrounds the lateral wall 10 of the main part 9. In FIG. 2, the operator control element 7 is arranged in a basic position. This means that the adjusting ring 14 is arranged in an axial basic position. In this axial basic position of the adjusting ring 14, in one advantageous embodiment no operating conditions of the household appliance 1 can be adjusted with the adjusting ring 14.

It is preferably provided that, in this axial basic position of the adjusting ring 14, said adjusting ring is arranged such that it axially overlaps over its entire height h with the main part 9, in particular the lateral wall 10.

It is preferably provided that, in this basic position, a front edge 15 of the adjusting ring 14 is arranged flush with the front face 11. It can be provided that, in this basic position, a rear edge 16 of the adjusting ring 14 is arranged such that it is spaced apart from the operator control panel 6. In the exemplary embodiment shown here, it can thus be provided that the height h of the adjusting ring 14 is smaller than the extent, measured in this depth direction, of the lateral wall 10 in front of the operator control panel 6.

The adjusting ring 14 is mounted by means of a bearing device 17 on the main part 9. This bearing device 17 can be a push-pull mechanism, for example. The bearing device 17 can however also have a different design. It can also have a different device with which the adjusting ring 14 is mounted on the main part 9. This bearing device 17 is embodied in particular such that the adjusting ring 14 is movable relative to the main part 9 in the state arranged on the main part 9. In particular, a movement in the direction of the longitudinal axis A and thus axially is enabled here. In addition, it is provided that this bearing device 17 enables a rotational movement of the adjusting ring 14 about the longitudinal axis A and in this regard also relative to the main part 9.

It can be provided that such a rotational movement of the adjusting ring 14 in the basic position of the adjusting ring 14, as shown in FIG. 2, is not possible. It can however be provided in an alternative embodiment that a rotational movement about the longitudinal axis A and relative to the main part 9 is enabled in this axial basic position of the adjusting ring 14.

Starting from the basic position shown in FIG. 2, the adjusting ring 14 of the operator control element 7 can be displaced in the axial direction. It is then displaced out of the basic position shown into at least one axial displacement position, for example. This axial displacement position is displaced forward relative to the basic position in the positive z direction. In this regard, FIG. 2 shows the further operator control element 8, which is embodied accordingly in one advantageous embodiment in the same manner as the operator control element 7, with an axial displacement position of the adjusting ring 14 in this regard. Because the operator control element 8 in the embodiment shown is embodied accordingly in the same manner as the operator control element 7, the same reference characters as for the operator control element 7 are assigned for the further operator control element 8 in the subsequent explanation. As can be seen from the operator control element 8 in FIG. 2, a display region 18 is embodied on the lateral wall 10. The display region 18 is part of the display unit 13. Information can be displayed optically with this electronic display region 18. As can be seen, this display region 18 is not visible in the basic position of the adjusting ring 14 and is obscured, in particular completely obscured, by the adjusting ring 14. If the adjusting ring 14 is then in an axial displacement position, as shown for the operator control element 8, this display region 18 is automatically exposed on the lateral wall 10 and is automatically visible. In this axial displacement position, the adjusting ring 14 is positioned such that it protrudes forward relative to the front face 11.

It is provided that, in at least one defined axial displacement position of the adjusting ring 14 which is different from the axial basic position of the adjusting ring 14, a function of the household appliance 1 linked thereto is selected automatically and thus also adjusted automatically.

It can be provided that, in at least one axial displacement position of the adjusting ring 14, which is different from an axial basic position of the adjusting ring 14, the adjusting ring 14 has an axially fixed position. This can also be achieved with the bearing device 17. This bearing device 17 thus also represents a positioning unit. This can also be referred to as a locking unit. In one advantageous embodiment, it can be provided that the adjusting ring 14 is rotatable about the longitudinal axis A in the axial displacement position. Here, the main part 9 remains fixed. A rotation of the adjusting ring 14 relative to the main part 9 therefore takes place. This rotational movement of the adjusting ring 14 can also be used to adjust operating conditions of the household appliance 1. Parameter values of an operating parameter of the functional unit of the household appliance 1 can be adjusted here, for example.

In one advantageous embodiment, the display region 18 is a touch-sensitive display region. It can be provided that at least one function symbol 19, in particular several function symbols 19, are or can be displayed on this display region 18. In one advantageous embodiment, these function symbols 19 can be arranged in a sequence in the azimuthal direction about the longitudinal axis A. It can be provided that these function symbols 19 can be changed in terms of their azimuthal sequential position. This can take place automatically as a function of an actuation of the adjusting ring 14, for example. In addition or instead, it can be provided that such a change of sequential position can be carried out by a user himself. If for example the display region 18 is touch-sensitive, the user can press on a specific function symbol 19 with a finger and can then displace it by swiping it along the lateral wall 10 into a desired position on the display region 18.

A function symbol 19 can then be displaced into a 12 o'clock position, for example.

It can also be provided that the function whose function symbol 19 is arranged in the 12 o'clock position on the display region 18 can be selected with the adjusting ring 14 and/or an operating parameter of this function can be adjusted by actuating the adjusting ring 14. Such an actuation can be a further drawing in the axial direction and/or a rotation about the longitudinal axis A, for example.

Figure 3:
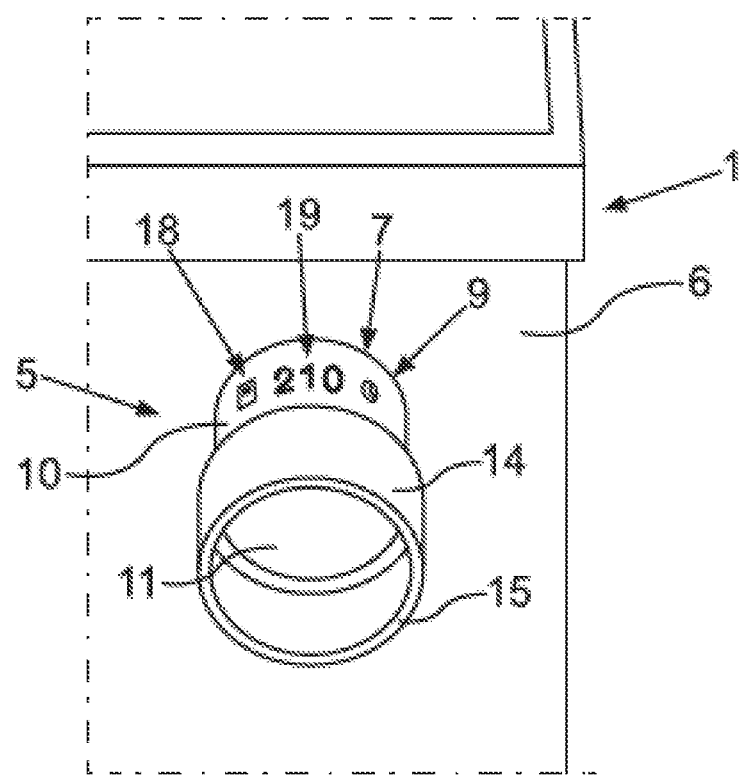
FIG. 3 shows a further representation of a subregion of the household appliance with an operator control element, in which the adjusting ring is arranged in an axial displacement position.

FIG. 3 shows, in another representation of a subregion of the household appliance 1, the operator control element 7 in an arrangement in which the adjusting ring 14 is arranged in an axial displacement position. It can be seen in FIG. 3 that several such function symbols 19, here three such function symbols 19, are arranged relative to one other in this azimuthal sequential position. Here, a function symbol is also in particular a specific parameter value "210".

In one advantageous embodiment, it can also be provided that the optical display on the display region 18 is effectively represented as a dynamic running indicator. This means for example that specific numeric values can be displayed in azimuthal sequence on the display region 18. If the adjusting ring 14 is rotated about the longitudinal axis A, then this electronically generated representation of the parameter values can be rotated along with the rotational movement of the adjusting ring 14. Depending on the rotational position, the parameter value that is currently set is always displayed in the 12 o'clock position. At least several parameter values are therefore then displayed simultaneously at all times on this display region 18. In particular, the one in the 12 o'clock position can be enlarged and/or displayed in a different color and/or brighter.

Alternatively, it can also be provided that only a specific set numeric value of an operating parameter is always displayed on the display region 18, in particular in this 12 o'clock position. In this embodiment, simultaneously displayed and different parameter values on the display region 18 are not therefore rotated along with the adjusting ring 14 when said adjusting ring is rotated.

Once the adjustment with the operator control element 7 is finished, the adjusting ring 14 can be pushed out of an axial displacement position back into the basic position. This can take place by way of direct manual actuation by the user. In one alternative, however, said adjusting ring can be moved independently back into the basic position in a linear manner. This can be the case for example if a push-pull mechanism is embodied with respect to the bearing device 17. If, in addition or instead, at least one spring is also provided which has a certain pretensioning, when the adjusting ring 14 is brought into the axial displacement position the basic position of the adjusting ring 14 can be set by returning said adjusting ring automatically via this spring element. It can however also be provided that the operator control element 7 and/or 8 has a motor, with which the adjusting ring 14 can be displaced axially. It is therefore possible to move the adjusting ring 14 from the basic position into a discrete defined axial displacement position by pressing on the front face 11, without the user having to directly grip and pull the adjusting ring 14 manually. A corresponding action can also take place in addition or instead when the adjusting ring 14 is brought from the axial displacement position into the basic position.

The invention claimed is:

1. An operator control device for a household appliance, said operator control device comprising:
   an operator control element defining a longitudinal axis, said operator control element including a cylindrical main part and an adjusting ring separate from the main part and arranged so as to engage around the main part, said adjusting ring being displaceable relative to the main part in a direction of the longitudinal axis of the operator control element for adjusting an operating condition of the household appliance; and
   a display unit for display of information on a display region on a lateral wall of the main part of the operator control element, wherein the display region is a touch-sensitive display region.

2. The operator control device of claim 1, wherein the display region is obscured by the adjusting ring in an axial basic position of the adjusting ring on the main part.

3. The operator control device of claim 1, wherein the display region is freely visible in an axial displacement position of the adjusting ring on the main part.

4. The operator control device of claim 1, wherein the adjusting ring has a height, measured in the direction of the longitudinal axis of the operator control element, with the height of the adjusting ring being smaller than a height of the lateral wall of the main part.

5. The operator control device of claim 1, wherein, in at least one defined axial displacement position of the adjusting ring which is different from an axial basic position of the adjusting ring, a function of the household appliance linked thereto is adjusted automatically.

6. The operator control device of claim 1, wherein the adjusting ring is displaceable into an axial displacement position which is different from an axial basic position of the adjusting ring and in which the adjusting ring is axially fixed.

7. The operator control device of claim 1, wherein the adjusting ring is displaceable into an axial displacement position which is different from an axial basic position of the adjusting ring and in which the adjusting ring is displaced axially relative to the main part and is rotatable about the longitudinal axis of the operator control element for adjusting an operating condition of the household appliance.

8. The operator control device of claim 1, wherein the display region displays several function symbols for functions of the household appliance in a circumferential direction about the longitudinal axis of the operator control element.

9. The operator control device of claim 8, wherein the function symbols are changeable in terms of their azimuthal sequential position.

10. The operator control device of claim 8, wherein one of the functions is commensurate with one of the function symbols arranged in a 12 o'clock position on the display region, and is selectable with the adjusting ring and/or an operating parameter of the one of the functions is adjustable by actuating the adjusting ring.

11. The operator control device of claim 8, wherein one of the function symbols is displaceable into a 12 o'clock position by swiping the one of the function symbols along the display region with a user's finger.

12. The operator control device of claim 1, wherein the display unit is arranged in the main part of the operator control element.

13. A household appliance, comprising an operator control device, said operator control device comprising an operator control element defining a longitudinal axis, said operator control element including:
   a cylindrical main part and an adjusting ring separate from the main part and arranged so as to engage around the main part, said adjusting ring being displaceable relative to the main part in a direction of the longitudinal axis of the operator control element for adjusting an operating condition of the household appliance, and
   a display unit configured to display of information on a display region on a lateral wall of the main part of the operator control element, wherein the display region is configured to display function symbols in a circumferential direction on the lateral wall and change the display of the function symbols in terms of position along the circumferential direction.

14. A method for operating a household appliance which includes an operator control device with an operator control element comprising a cylindrical main part and an adjusting ring arranged around the main part, said method comprising:
   actuating the operator control device to set an operating condition of the household appliance by drawing the adjusting ring of an operator control element axially forward relative to the main part of the operator control element;
   displaying information including function symbols on a display region in a circumferential direction on a lateral wall of the main part of the operator control element; and
   changing the display of the function symbols in terms of position along the circumferential direction.

15. The method of claim 14, further comprising rotating the adjusting ring about a longitudinal axis of the operator control element for adjusting the operating condition of the household appliance.

16. The method of claim 14, wherein the display region displays several function symbols for functions of the household appliance in a circumferential direction about a longitudinal axis of the operator control element.

17. The method of claim 16, wherein the changing the display of the function symbols comprises changing the function symbols in terms of their azimuthal sequential position by enabling a user with a finger to swipe the function symbols along the display region.

18. The method of claim 16, further comprising selecting with the adjusting ring one of the functions commensurate with one of the function symbols arranged in a 12 o'clock position on the display region and/or adjusting an operating parameter of the one of the functions by actuating the adjusting ring.

* * * * *